3,451,994
14β-HYDROXY-16β,21-OXIDONORCHOLAN-23-OIC ACID LACTAMS AND DERIVATIVES
Jean-Marie Ferland and Yvon Lefebvre, Montreal, Quebec, Canada, assignors to American Home Products Corporation, New York, N.Y., a corporation of Delaware
No Drawing. Filed Nov. 2, 1967, Ser. No. 680,026
Int. Cl. C07c *173/10*
U.S. Cl. 260—210.5                                     16 Claims

ABSTRACT OF THE DISCLOSURE

There are disclosed herein 3β,14β-dihydroxy-21-amino-14β,21-oxidonorcholan-23-oic acid lactam, its N-methyl, N-ethyl, N-propyl, N-isopropyl and N-benzylamine derivatives, the 3β-tridigitosides and 3β-(β-d-glucopyranoside) derivatives of the above compounds as well as their 3β-acetoxy, 3β-propionyloxy and 3β-butanoyloxy derivatives; the compound 3β-acetoxy-14β-hydroxy-21-(N-acetylamino)-16β,21-oxidonorcholan-23-oic acid lactam is also disclosed. All the above compounds are obtained as mixtures of two isomers, and methods for the separation of those isomers are also given. The compounds of this invention have cardiotonic activities, and a process for their preparation as well as methods for their use are also disclosed.

This invention relates to a novel class of norcholane derivatives, especially 14β - hydroxy - 16β,21 - oxidonorcholan-23-oic acid lactams, and to a process for preparing the compounds of this invention.

More specifically, this invention relates to a new class of steroids which may be represented by the Formula I:

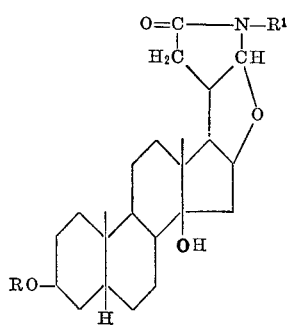

in which R represents hydrogen, a lower aliphatic acyl group containing from 2–4 carbon atoms, a hexoside group such as, for example, the glucosyl group, or a glycosidic component as encountered in naturally occurring glycosides; $R^1$ represents hydrogen, a lower alkyl group containing from 1–3 carbon atoms or the benzyl group.

The naturally occurring glycosides are used extensively for the treatment of congestive heart failure because of their ability to increase the force of the myocardial contraction. However, those glycosides possess a narrow margin of safety between their therapeutic and toxic doses (e.g. G. K. Moe and A. E. Farah in "The Pharmacological Basis of Therapeutics," L. S. Goodman and A. Gilman, editors, 3rd edition, 1955, pp. 665–698). We have found that the new norcholane derivatives of this invention are able to increase the force of the myocardial contraction with a wider margin of safety than previously obtained with the naturally occurring glycosides. They are therefore useful as cardiotonic drugs and may be administered orally formulated with suitable excipients in form of tablets or capsules containing from 1 to 100 mg. of the active ingredient or by injection in the form of pharmaceutically acceptable sterile solutions or suspensions in pharmaceutically acceptable vehicles containing from 1 to 100 mg. of the active ingredient on a daily basis or as directed by the physician.

We prefer to use as starting materials for our invention the naturally occurring glycoside gitoxin or its corresponding aglycone which is obtained by enzymatic, alkaline or acid hydrolysis as described, for example, by L. F. Fieser and M. Fieser in "Steroids," 1959, pp. 727–809. These starting materials are represented by the Formula II:

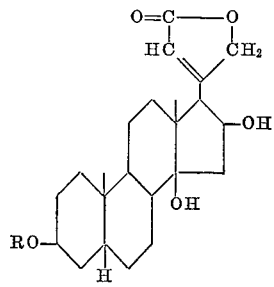

in which R represents hydrogen or the glycosidic component as encountered in the naturally occurring glycoside gitoxin.

The new norcholane derivatives of this invention are readily prepared by reacting the starting materials of Formula II with ammonia or an organic primary amine, such as, for example, methylamine, ethylamine, propylamine, isopropylamine, or benzylamine to obtain the compounds of Formula I in which $R^1$ represents hydrogen, or the methyl, ethyl, propyl, isopropyl, or benzyl group, respectively.

The facile formation of the lactams of this invention may be explained by formation of a lactol intermediate of Formula III:

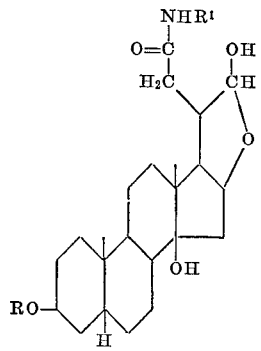

in which R and $R^1$ are as defined above.

The lactam is then formed under the conditions of the reaction of this invention by the attack on $C^{21}$ of the free pair of electrons on the nitrogen atom and concomitant elimination of one molecule of water.

In practising the process of this invention we prefer to mix the starting materials of Formula II with the ammonia or the organic primary amine in an inert organic solvent and allow the mixture to react, preferably in a closed vessel, at temperatures ranging from room temperature to 180° C. for a time period ranging from one hour to eight days. We have found that the best procedure for this reaction is to prepare first solution saturated at 0° C. with the volatile amine reactant in an organic solvent which is inert to the reaction conditions. Such solvents include lower aliphatic alcohols such as, for example, methanol, ethanol, propanol, isopropanol, butanol and t-butanol, aliphatic and cyclic ethers such as, for example, diethyl ether, dioxane or tetrahydrofuran, aromatic hydrocarbons such as, for example, benzene, toluene, or xylene, lower aliphatic halogenated hydrocarbons such as, for example, methylene chloride, chloroform or ethylene dichloride. The less volatile amine, benzyl amine, may be employed directly by diluting it with an equal volume of one of the above inert organic solvents.

The solution of starting material of Formula II in the above described solvents saturated with the above mentioned amine reactant is placed in a closed vessel, or in the case when the amine reactant is benzylamine it has been found ot be just as advanatgeous to place the reaction mixture in a reaction flask equipped with a reflux condenser.

The temperature and time of the reaction are not critical and may vary from room temperature to the boiling point of the reaction mixture, and from a few hours to a few days. They are chosen to give optimum yields of the products of this invention in a reasonable time period. Most advantageously the reaction mixtures containing ammonia are usually heated at 110° C. for 18 hours; the mixtures containing methylamine, ethylamine, propylamine or isopropylamine are usually allowed to react at room temperature for two days; and the reaction mixtures containing benzylamine are usually heated at 60° C. or at the reflux temperature of the mixture for three days. After the above reaction conditions have been completed the volatile components of the reaction mixture are removed by evaporation and the resultant lactams of Formula I, which are mixtures of two isomers, may be purified by conventional purification methods such as, for example, crystallization.

These two isomers, which we have designated as isomers A and B for the sake of convenience are apparently formed as a result of the introduction of new assymetric centers into the norcholane nucleus at positions 20 and 21. These isomers are distinguished from each other by their difference in physical constants.

These isomers may be easily separated in some cases. For example, the isomeric lactams of Formula I, in which R corresponds to an acyl group and $R^1$ is as defined above, may be separated by chromatography. Subsequent hydrolysis of the ester groups yields the pairs of pure isomeric lactams of Formula I, in which R represents hydrogen and $R^1$ is as defined above.

Improved yields of the lactams of this invention of Formula I in which R represents hydrogen or a lower aliphatic acyl group are obtained when the crude reaction mixture after evaporation of excess volatile amines and solvents is treated with a dilute aqueous mineral acid such as, for example, hydrochloric or sulfuric acid, in solution in a lower alkanol, such as, for example, methanol. The organic solvent is then evaporated and the residue is diluted with water to obtain the desired lactams of Formula I either by filtration or by extraction with a water-immiscible solvent. They may then be purified as described above.

The above novel norcholane derivatives of Formula I, in which R represents hydrogen, may be acylated by treatment with an appropriate lower aliphatic acid anhydride or halide containing from 2–4 carbon atoms in pyridine to afford the corresponding acylated derivatives of Formula I. When this reaction is carried out at an elevated temperature within the range of from 50° C. to 150° C. with the norcholane derivative of Formula I in which $R^1$ represents hydrogen, the corresponding acylated derivatives of Formula I in which $R^1$ represents a lower aliphatic acyl group are obtained. As previously mentioned, all of those acylated compounds are mixtures of two isomers which may be separated by chromatography.

Furthermore, the new norcholane derivatives of Formula I, in which R represents hydrogen may be converted to their corresponding 3β-hexosides by reacting them with suitable hexose derivatives, such as, for example, with acetobromoglucose, preferably in dioxan solution, and in the presence of silver oxide and magnesium sulfate, as described by Elderfield et al. in J. Am. Chem. Soc. vol. 69, p. 2235 (1947) or in ethylene dichloride with silver carbonate as described by Zorback et al. in J. Med. Chem. vol. 6, p. 298 (1963). In this manner when using, for example, acetobromoglucose, there are obtained the corresponding 3β-tetraacetyl-d-glucosides of the compounds of this invention of Formula I, in which R represents the tetraacetylglucosyl group. The latter compounds may then be deacylated, preferably with barium methoxide as described by Elderfield et al. cited above, to obtain the corresponding 3β-d-glucosides of this invention.

The following examples will illustrate the scope of this invention.

Example 1

A solution of gitoxin (2.0 g.) in methanol (250 ml.) saturated with ammonia at 0° C. is heated at 110° C. in a Parr bomb for 16 hours. The reaction mixture is evaporated under reduced pressure to give 3β-tridigitosyl-14β-hydroxy-21-amino-16β,21-oxidonorcholan-23-oic acid lactams (mixture of two isomers)

$\nu_{max.}^{KBr}$ 3400

1670, 1020 cm.$^{-1}$.

Similarly, gitoxin yields upon treatment with methylamine, ethylamine, propylamine and isopropylamine at room temperature for two days 3β-tridigitosyl-14β-hydroxy - 21 - (N-methylamino)-(M.P. 255–257° C.)-, -21-(N-ethylamino)-, -21-(N-propylamino)- and -21-(N-isopropylamino)-16β,21-oxidonorcholan-23-oic acid lactams, respectively.

In the same manner but using benzylamine at the reflux temperature of the mixture, gitoxin yields 3β-tridigitosyl-14β-hydroxy - 21 - (N-benzylamino) - 16β,21 - oxidonorcholan-23-oic acid lactams. All the above compounds are obtained as mixtures of two isomers.

Example 2

A solution of gitoxigenin (2.0 g.) in methanol (100 ml.) saturated at 0° C. with ammonia is heated at 110° C. in a Parr bomb for 18 hours. The reaction mixture is evaporated to dryness, the residue dissolved in methanol (120 ml.) and refluxed with 60 ml. of 0.1 N sulfuric acid for 15 minutes. After addition of pyridine (0.6 ml.) the solution is evaporated almost to dryness. The residue is taken up in chloroform, washed with water, dried and evaporated, to yield 3β,14β-dihydroxy-21-amino-16β,21-oxidonorcholan-23-oic acid lactams $\nu_{max.}^{KBr}$ 3350

1675 cm.$^{-1}$.

Similarly, gitoxigenin yields upon treatment with methylamine, ethylamine, propylamine and isopropylamine at room temperature for two days 3β,14β-dihydroxy-21-(N-methylamino)-

$\nu_{max}^{KBr}$ 3350

1675 cm.$^{-1}$), -21-(N-ethylamino)-, -21-(N-propylamino)- and -21-(N - isopropylamino)-16β,21-oxidonorcholan-23-oic acid lactams, respectively.

In the same manner, but using benzylamine at the reflux temperature of the mixture, gitoxigenin yields 3β,14β-dihydroxy-21-(N-benzylamino - 16β,21 - oxidonorcholan-23-oic acid lactams.

All the above compounds are obtained as mixtures of two isomers.

Example 3

A solution of 3β,14β-dihydroxy-21-(N-methylamino)-16β,21-oxidonorcholan-23-oic acid lactams (1.0 g.), obtained as described in Example 2, in pyridine (10 ml.) and acetic anhydride (5 ml.) is allowed to stand overnight at room temperature. The solution is poured into ice-cold water, saturated with sodium chloride, and extracted with chloroform. The organic layer is washed with 2% sulfuric acid and water, dried and evaporated, to yield an oil which is subjected to chromatography on silica gel. The fractions eluted with methylene chloride-ethyl acetate (50/50) are a mixture of two isomeric lactams. The fractions richer in the less polar isomer, as shown by thin-layer chromatography from isopropanol/benzene (15/85) are combined and crystallized from methylene chloride-ether to give 3β - acetoxy 14β - hydroxy - 21 - (N-methylamino)-16β,21 - oxidonorcholan-23-oic acid lactam (isomer A), M.P. 229–231° C.; the fractions richer in the more polar isomer identified by thin-layer chromatography as above, are combined and crystallized from methylene chloride-ether to give isomer B of the above compound, M.P. 272–274° C.

Similarly 3β,14β-dihydroxy - 21 - amino-, -21-(N-ethylamino)-, -21-(N-propylamino)-, -21-(N-isopropylamino)- and -21-(benzylamino) - 16β,21 - oxidonorcholan-23-oic acid lactams yield isomers A and B of 3β-acetoxy-14β-hydroxy-21-amino-, -21-(N - ethylamino-, -21-(N-propylamino)-, -21-(N - isopropylamino)- and 21-(N - benzylamino)-16β,21-oxidonorcholan-23-oic acid lactams, respectively.

In the same manner but using propionic anhydride or butyryl chloride 3β,14β-dihydroxy - 21 - amino-, 21-(N-methylamino)-, 21-(N - ethylamino)-, -21-(N - propylamino)-, -21-(N - isopropylamino)- and -21-(N - benzylamino)-16β,21-oxidonorcholan-23-oic acid lactams yield isomers A and B of 3β-propionyloxy or 3β-butanoyloxy-14β-hydroxy-21-amino-, -21-(N-methylamino)-, -21-(N-ethylamino)-, -21-(N-propylamino)-, -21-(N - isopropylamino)- and -21-(N - benzylamino) - 16β,21 - oxidonorcholan-23-oic acid lactams, respectively.

Example 4

A solution of isomer B of 3β-acetoxy-14β-hydroxy-21-(N-methylamino)-16β,21-oxidonorcholan-23-oic acid lactam, obtained as described in Example 3, (0.50 g.) in potassium carbonate (0.50 g.), methanol (20 ml.), and water (5 ml.) is refluxed for two hours. The solution is evaporated under reduced pressure until a solid appears. The mixture is poured into excess 2 percent sulfuric acid, saturated with sodium chloride and extracted with chloroform. The chloroform is washed with a saturated sodium chloride solution, dried, and evaporated to yield isomer B of 3β,14β-dihydroxy-21-(N-methylamino)-16β,21-oxidonorcholan-23-oic acid lactam.

In the same manner, isomer A of the above starting material obtained as described in Example 3 yields isomer A of the above compound.

Again in the same manner, isomers A and B of 3β-acetoxy-21-amino-, -21-(N-ethylamino)-, -21-(N-propyl- amino)-, -21-(N-isopropylamino)- and -21 - (N - benzylamino)-16β,21-oxidonorcholan-23-oic acid lactams obtained as described in Example 3, yield isomers A and B of 3β,14β-dihydroxy-21-amino-, -21-(N-ethylamino)-, -21-(N-propylamino)-, -21-(N-isopropylamino)- and -21-(N-benzylamino)-16β,21-oxidonorcholan-23-oic acid lactams, respectively.

Example 5

A mixture of isomer B of 3β,14β-dihydroxy-21-(N-methylamino)-16β,21-oxidonorcholan-23-oic acid lactam (1.0 g.) obtained as described in Example 4, succinic anhydride (1.5 g.) and pyridine (10 ml.) is allowed to stand at room temperature overnight, heated on the steam bath for two hours, cooled, poured into ice-water, and acidified with 10 percent sulfuric acid. The solid obtained is filtered, dried, and crystallized from methylene chloride-ether, to yield isomer B of 3β-hemisuccinoyloxy-14β-hydroxy - 21 - (N-methylamino)-16β,21-oxidonorcholan-23-oic acid lactam.

In the same manner, when starting with isomer A of the above starting material, the corresponding 3β-hemisuccinate is also obtained.

Again in the same manner, isomers A and B of 3β, 14β - dihydroxy - 21 - amino -, - 21 - (N - ethylamino)-, -21-(N-propylamino)-, -21-(N-isopropylamino)-, and -21-(N-benzylamino)-16β,21-oxidonorcholan-23-oic acid lactams, all obtained as described in Example 4, yield isomers A and B of the 3β-hemisuccinoyloxy-14β-hydroxy-21-amino-, -21-(N-ethylamino)-, -(21-N-propylamino)-, -21-(N-isopropylamino)-, and -21-(N-benzylamino)- 16β,21-oxidonorcholan-23-oic acid lactams, respectively.

The sodium salts of all of the above hemisuccinates are prepared by treating the compounds obtained as described above in solution in ethanol with the equivalent amounts of a 10 percent aqueous solution of sodium bicarbonate, followed by evaporation to dryness under reduced pressure.

Example 6

A mixture of isomer B of 3β-acetoxy-14β-hydroxy-21-amino-16β,21-oxidonorcholan-23-oic acid lactam prepared as described in Example 3 (125 mg.), acetic anhydride (2 ml.) and pyridine (2 ml.) is heated for 16 hours on the steam bath, cooled, and poured into ice water. The solid obtained is filtered, and dried. Crystallization yields isomer B of 3β-acetoxy-14β-hydroxy-21-(N-acetylamino)-16β,21-oxidonorcholan-23-oic acid lactam.

In the same manner, isomer A of the above starting material, also prepared as described in Example 3, yields, after treatment as above, isomer A of the above compound.

Example 7

A solution of isomer B of 3β,14β-dihydroxy-21-(N-methylamino)-16β,21-oxidonorcholan-23-oic acid lactam, prepared as described in Example 4 (0.375 g.) in dry dioxan (10 ml.) is stirred at room temperature for one hour with dry silver oxide (0.5 g.) and anhydrous magnesium sulfate (1.0 g.). A solution of acetobromoglucose (0.82 g.) in dioxan (5 ml.) is added dropwise over a period of one hour, and stirring is continued for 24 hours at room temperature.

After working up as described by Elderfield et al. cited above, isomer B of 3β(β-d-tetraacetylglucopyranosyl) - 14β - hydroxy-21-N-(methylamino)-16β,21-oxidonorcholan-23-oic acid lactam is obtained.

In the same manner, isomer A of the above starting material yields isomer A of 3β-(β-d-tetraacetylglucopyranosyl) - 14β - hydroxy-21 - N-(methylamino)-16β,21-oxidonorcholan-23-oic acid lactam.

By hydrolysis of the 3β-d-tetracetylglucopyranosides obtained above, in methanol with approximately 0.05 N barium methoxide, following the procedure of Elderfield et al. cited above, the isomer A and B of 3β-(β-d-glucopyranosyl) - 14β - hydroxy-21-N-(methylamino)-16β,21-oxidonorcholan-23-oic acid lactams are obtained.

Again in the same manner, when starting with isomer A or B of 3β,14β-dihydroxy-21-amino-, -21-(N-ethylamino)-, -21-(N-propylamino)-, -21-(N-isopropylamino)-, or -21 - (N - benzylamino)-16β,21-oxidonorcholan-23-oic acid lactams and proceeding as above via the intermediate 3β-(β-d-tetraacetylglucopyranosyl) derivatives, there are obtained isomers A and B of 3β-(β-d-glucopyranosyl)-14β-hydroxy-21-amino-, -21-(N-ethylamino)-, -21-(N-propylamino)-, -21-(N-isopropylamino)- and -21-(N-benzylamino)-16β,21-oxidonorcholan-23-oic acid lactams, respectively.

What is claimed is:
1. Compounds of the formula

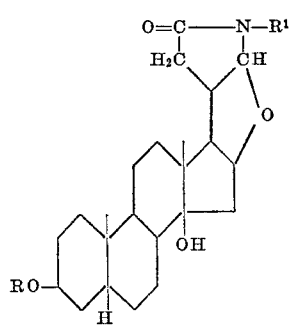

wherein R represents hydrogen, a lower aliphatic acyl group containing from 2 to 4 carbon atoms, a hexoside group, or a glycosidic component as encountered in naturally-occurring glycosides; and $R^1$ represents hydrogen, a lower alkyl group containing from 1 to 3 carbon atoms, or the benzyl group.

2. 3β - tridigitosyl - 14β-hydroxy-21-amino-16β,21-oxidonorcholan-23-oic acid lactams, as claimed in claim 1.

3. 3β-tridigitosyl - 14β - hydroxy-21-(N-methylamino)-16β,21-oxidonorcholan-23-oic acid lactams, as claimed in claim 1.

4. 3β,14β-dihydroxy-21-amino-16β,21 - oxidonorcholan-23-oic acid lactams, as claimed in claim 1.

5. 3β,14β - dihydroxy-21-(N-methylamino)-16β,21-oxidonorcholan-23-oic acid lactams, as claimed in claim 1.

6. 3β-acetoxy-14β-hydroxy-21-amino-16β,21-oxidonorcholan-23-oic acid lactams, as claimed in claim 1.

7. 3β-acetoxy-14β-hydroxy-21-(N-methylamino) - 16β, 21-oxidonorcholan-23-oic acid lactams, as claimed in claim 1.

8. 3β-hemisuccinoyloxy-14β-hydroxy-21-amino-16β,21-oxidonorcholan-23-oic acid lactams, as claimed in claim 1.

9. 3β-hemisuccinoyloxy-14β-hydroxy-21-(N-methylamino) - 16β,21 - oxidonorcholan - 23 - oic acid lactams, as claimed in claim 1.

10. 3β-acetoxy-14β-hydroxy-21-(N-acetylamino)-16β, 21-oxidonorcholan-23-oic acid lactams, as claimed in claim 1.

11. 3β-(β-d-glucopyranosyl)-14β-hydroxy - 21 - amino-16β,21-oxidonorcholan-23-oic acid lactams, as claimed in claim 1.

12. 3β-(β-d-glucopyranosyl)-14β-hydroxy-21-(N - methylamino)-16β,21-oxidonorcholan-23-oic acid lactams, as claimed in claim 1.

13. The process of preparing compounds of the formula

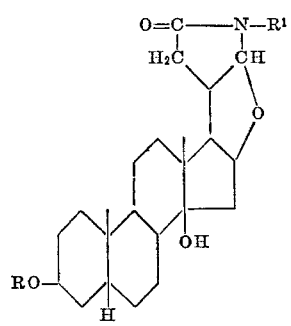

wherein R represents hydrogen, a lower aliphatic acyl group containing from 2 to 4 carbon atoms, a hexoside group, or a glycosidic component as encountered in naturally-occurring glycosides; and $R^1$ represents hydrogen, a lower alkyl group containing from 1 to 3 carbon atoms, or the benzyl group; which comprises treating a starting material of the formula

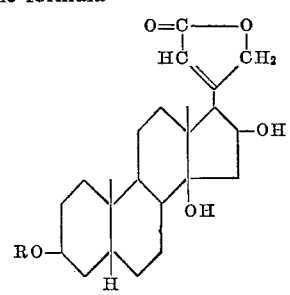

wherein R represents hydrogen or the glycosidic component as encountered in the naturally-occurring glycoside gitoxin with a reagent selected from the group consisting of ammonia and the organic primary amines methylamine, ethylamine, propylamine, isopropylamine and benzyl amine.

14. The process as defined in claim 13 wherein the treatment of the said starting material with ammonia or an organic primary amine is carried out in a closed vessel and at a temperature ranging from room temperature to 180° C.

15. The process as defined in claim 14 wherein the reaction is carried out in an inert solvent.

16. The process as defined in claim 15 wherein said inert solvent is one selected from the group which consists of methanol, ethanol, propanol, isopropanol, butanol, t-butanol, diethyl ether, dioxane, tetrahydrofuran, benzene, toluene, xylene, methylene chloride, chloroform and ethylene dichloride.

References Cited

Schreiber et al. Experientia vol. XVI, No. 12, 1960, p. 536.

LEWIS GOTTS, *Primary Examiner.*

ETHEL G. LOVE, *Assistant Examiner.*

U.S. Cl. X.R.
260—239.55, 999